United States Patent
Ataka et al.

(10) Patent No.: US 8,395,733 B2
(45) Date of Patent: Mar. 12, 2013

(54) LIQUID CRYSTAL DISPLAY MANUFACTURING METHOD, LIQUID CRYSTAL DISPLAY, AND ELECTRONIC APPARATUS

(75) Inventors: Miyuki Ataka, Nagano (JP); Hironori Taniguchi, Tottori (JP); Shinichiro Tanaka, Tottori (JP); Masaki Kajiyama, Tottori (JP); Naoaki Omae, Tottori (JP)

(73) Assignee: Sony Corporation, Tokyo (JP)

( * ) Notice: Subject to any disclaimer, the term of this patent is extended or adjusted under 35 U.S.C. 154(b) by 62 days.

(21) Appl. No.: 12/983,614

(22) Filed: Jan. 3, 2011

(65) Prior Publication Data

US 2011/0299017 A1  Dec. 8, 2011

(30) Foreign Application Priority Data

Jan. 14, 2010 (JP) ................ P2010-005637

(51) Int. Cl.
*G02F 1/1333* (2006.01)
(52) U.S. Cl. ...................................................... 349/122
(58) Field of Classification Search .......... None
See application file for complete search history.

(56) References Cited

U.S. PATENT DOCUMENTS

| 8,087,967 B2 * | 1/2012 | Shinya et al. ............ 445/58 |
| 2008/0137024 A1 | 6/2008 | Nagami et al. |
| 2009/0086123 A1 * | 4/2009 | Tsuji et al. ............ 349/58 |
| 2010/0245707 A1 * | 9/2010 | Harada ............ 349/58 |

FOREIGN PATENT DOCUMENTS

JP  2008-145634  6/2008

* cited by examiner

*Primary Examiner* — Sung Pak
(74) *Attorney, Agent, or Firm* — K&L Gates LLP

(57) ABSTRACT

A method of manufacturing a liquid crystal display includes: forming a protective film on at least either of first and second mother substrates disposed opposite to each other and each having panel regions; removing the protective film in a region which is associated with at least start and end points of a seal material and which is near the periphery of an area including the panel regions, applying the seal material to the protective film on the first and second mother substrates in the vicinity of dividing lines at which the mother substrates are divided into individual panel regions using a dispenser, the seal material being applied from the start to end points to form a gap to serve as a liquid crystal injection port; combining the first and second mother substrates; and dividing the combined first and second mother substrates into the individual panel regions.

10 Claims, 12 Drawing Sheets

LIQUID CRYSTAL DISPLAY MANUFACTURING METHOD, LIQUID CRYSTAL DISPLAY, AND ELECTRONIC APPARATUS

CROSS REFERENCES TO RELATED APPLICATIONS

The present application claims priority to Japanese Priority Patent Application JP 2010-005637 filed in the Japan Patent Office on Jan. 14, 2010, the entire contents of which is hereby incorporated by reference.

BACKGROUND

The present application relates to a liquid crystal display, a method of manufacturing such a liquid crystal display, and an electronic apparatus. More particularly, the application relates to a liquid crystal display having a seal material for combining a pair of mother substrates disposed opposite to each other, a method of manufacturing such a liquid crystal display, and an electronic apparatus having such a liquid crystal display.

Liquid crystal displays having a seal material for combining a pair of mother substrates disposed opposite to each other, a method of manufacturing such liquid crystal displays, and electronic apparatus having such a liquid crystal display have been known (for example, see JP-A-2008-145634 (Patent Document 1)).

Patent Document 1 discloses a liquid crystal display including a TFT substrate (first mother substrate) and an opposite substrate (second mother substrate) disposed opposite to each other, injection holes/columnar spacers formed on a surface of the opposite substrate, and a seal material for combining the TFT substrate and the opposite substrate. In such a liquid crystal display, the seal material is applied along the periphery of each panel region of the TFT substrate and the opposite substrate using a dispenser, the application being started at a start point and ended at an end point. The injection holes/columnar spacers are made of a photosensitive resin, and one injection hole/columnar spacer is provided between the start point of the seal material and the panel region adjacent to the same and between the end point of the seal material and the panel region adjacent to the same. When the TFT substrate and the opposite substrate are combined, the seal material is spread toward the adjacent panel regions by the TFT substrate and the opposite substrate. Since the seal material thus spread is stopped by the injection holes/columnar spacers, it is possible to prevent the seal material from being pushed out from the neighborhood of peripheries of the TFT substrate and the opposite substrate (toward the adjacent panel regions).

SUMMARY

The liquid crystal display disclosed in patent Document 1 includes the injection holes/columnar spacers provided as extra parts to prevent the seal material from being pushed out into the panel regions when the TFT substrate and the opposite substrate are combined. A problem therefore arises in that the structure of the display becomes complicated.

Thus, it is desirable to provide a liquid crystal display in which a seal material can be prevented from flowing out of place without using a complicated structure, a method of manufacturing such a liquid crystal display, and an electronic apparatus having such a liquid crystal display.

According to an embodiment, there is provided a method of manufacturing a liquid crystal display including the steps of forming a protective film on at least either of a first mother substrate and a second mother substrate which are disposed opposite to each other and each of which has a plurality of panel regions, removing the protective film in a region which is associated with at least a start point and an end point of a seal material and which is near the periphery of an area including the panel regions, applying the seal material to the protective film on the first mother substrate and the second mother substrate in the vicinity of dividing lines at which the mother substrates are divided into individual panel regions using a dispenser, the seal material being applied from the start point to the end point to form a gap to serve as a liquid crystal injection port, combining the first mother substrate and the second mother substrate, and dividing the combined first mother substrate and second mother substrate into the individual panel regions.

According to the method of manufacturing a liquid crystal display of the embodiment, as described above, the protective film is removed in the region which is associated with at least the start point and the end point of the seal material applied to form a gap to serve as a liquid crystal injection port and which is near the periphery of the area including the panel regions. Thus, when the first mother substrate and the second mother substrate are combined, the seal material spread by the first mother substrate and the second mother substrate flows into the region of the protective film where the seal material is removed. It is therefore possible to prevent the seal material from being pushed out from the neighborhood of the periphery of the area including the panel regions at least at the start point and the end point where the seal material is likely to be pushed out of place as a result of deposition of a great amount of the material which occurs when the seal material is applied using a dispenser. The seal material spread by the first mother substrate and the second mother substrate is prevented from being pushed out from the neighborhood of the periphery of the area including the panel regions as thus described. Since the effect can be achieved by only removing a part of the protective film, the display can be less complicated in structure than displays having extra structures provided to achieve the effect.

According to the embodiment of a method of manufacturing a liquid crystal display, the step of forming the protective film may include the step of forming the protective film from a photosensitive material, and the step of removing the protective film may include the step of removing a part of the protective film using a photolithographic technique. Such a configuration allows a desired region of the protective film to be easily removed using a photolithographic technique.

According to the embodiment of a method of manufacturing a liquid crystal display, each panel region may have a substantially rectangular shape when viewed from above. The step of applying the seal material may include the step of applying the seal material along the periphery of each panel region. The step of removing the protective film may include the step of removing a region of the protective film extending throughout the side of the area including the individual panel regions where the liquid crystal injection port is provided. The removed region excludes the region of the protective film which is associated with the liquid crystal injection port between the start point and the end point of the seal material and which is near the periphery of the area including the panel regions. In such a configuration, when the first mother substrate and the second mother substrate are combined, the seal material spread by the first mother substrate and the second mother substrate flows into the region of the protective film which extends throughout the side of the area including the individual panel regions where the liquid crystal injection port is provided and which is near the periphery of the area including the panel regions. Thus, the seal material can be made to flow onto the region where the protective film has been removed not only at the start and end points of the seal material but also throughout the side of the area where the liquid crystal injection port is provided. As a result, the seal material can be prevented from being pushed out from the neighborhood of the periphery of the area including the panel regions throughout the side of the area on which the liquid crystal injection port is provided.

According to the method of manufacturing a liquid crystal display of the embodiment, each panel region may have a substantially rectangular shape when viewed from above. The step of applying the seal material may include the step of applying the seal material along the periphery of each panel region. The step of removing the protective film may include the step of removing a region of the protective film which extends throughout the side of the area including the individual panel regions where the liquid crystal injection port is provided and which is near the periphery of the area including the panel regions, the removed region excluding the region of the protective film which is associated with the liquid crystal injection port between the start point and end point of the seal material. In such a configuration, the opening of the liquid crystal injection port can be kept small compared to the size of the opening formed when the region of the protective film associated with the liquid crystal injection port is removed. It is therefore possible to prevent a sealant for sealing the liquid crystal injection port from flowing in the liquid crystal injection port up to an undesirable depth. Thus, liquid crystal alignment can be prevented from disturbed by such a flow of the sealant up to an undesirable depth in the liquid crystal injection port.

According to the method of manufacturing a liquid crystal display of the embodiment, the step of removing the protective film may include the step of removing the region of the protective film which is associated with the start point and the end point of the seal material and which is near the periphery of the area including the panel regions, excluding a region of the protective film which is not associated with the start point and end point of the seal material. In such a configuration, when the first mother substrate and the second mother substrate are combined, the seal material flows into the region where the protective film has been removed only from the start and end points at which the seal material is likely to be pushed out of place because of deposition of a great amount of the material. It is therefore possible to prevent the seal material from being pushed out from the neighborhood of the periphery of the area including the panel regions at the start and end points.

According to the method of manufacturing a liquid crystal display of the embodiment, the step of removing the protective film may include the step of removing the region of the protective film which is associated with the liquid crystal injection port between the start point and the end point of the seal material and which is near the periphery of the area including the panel regions. In such a configuration, when the first mother substrate and the second mother substrate are combined, the seal material spread by the first and second mother substrate can be prevented from being pushed out from the neighborhood of the periphery of the area including the panel regions even if the seal material flows into the region of the liquid crystal injection port at the periphery of the area including the panel regions.

According to the method of manufacturing a liquid crystal display of the embodiment, the protective film may include a first protective film and a second protective film. The step of forming the protective film may include the step of forming the first protective film and the second protective film on surfaces of the first mother substrate and the second mother substrate, respectively. The step of removing the protective film may include the step of removing a region of the first protective film which is associated with at least the start point and the end point of the seal material and which is near the periphery of the area including the panel regions and the step of removing a region of the second protective film which is associated with at least the start point and the end point of the seal material and which is near the periphery of the area including the panel regions. In such a configuration, when the first mother substrate and the second mother substrate are combined, the seal material spread by the first and second mother substrates can be effectively prevented from being pushed out from the neighborhood of the periphery of the area including the panel regions because the seal material can be made to flow into the regions of the first and second mother substrates where the first and second protective films have been removed.

According to another embodiment, there is provided a liquid crystal display including a first substrate and a second substrate disposed opposite to each other, a protective film formed on a surface of at least either of the first substrate and the second substrate, and a seal material having a start point and an end point which define a gap to serve as a liquid crystal injection port and applied on to the protective film along the peripheries of the first substrate and the second substrate. The protective film is partially removed in a region which is associated with at least the start point and the end point of the seal material and which is opposite to the side of the seal material where the liquid crystal is injected, thereby providing a relief portion into which the seal material can flow.

In the above-described liquid crystal display, as described above, the protective film is partially removed in the region which is associated with at least the start point and the end point of the seal material and which is opposite to the side of the seal material where the liquid crystal is injected to provide a relief portion into which the seal material can flow. When the first substrate and the second substrate are combined, the seal material spread by the first and second substrates can be made to flow into the relief portion of the protective film. It is therefore possible to prevent the seal material from being pushed out from the neighborhood of the periphery of the area including the panel regions at least at the start and end points of the seal material where the seal material is likely to be pushed out of place as a result of deposition of a great amount of the material. Therefore, the structure of the display can be kept uncomplicated because it is possible to prevent the seal material spread by the first and second substrates from being pushed out from the neighborhood of the area of panel regions without provided an extra structure separately.

In the above-described liquid crystal display of the embodiment, the parts of the start point and the end point of the seal material formed in the relief portion of the protective film may have a thickness greater than the thickness of the seal material in a region thereof where the relief portion is not provided. In such a configuration, a greater amount of the seal material can be made to flow into the relief portion of the protective film associated with the start and end points of the seal material because the part of the protective film formed with the relief portion is greater in thickness than other regions. Thus, the seal material can be easily prevented from being pushed out at the start and end points of the seal material.

According to another embodiment, there is provided an electronic apparatus including a liquid crystal display having any of the above-described configurations. Such configurations make it possible to provide an electronic apparatus having a liquid crystal display in which a seal material can be prevented from being pushed out without using a complicated structure.

Additional features and advantages are described herein, and will be apparent from the following Detailed Description and the figures.

DETAILED DESCRIPTION

Embodiments of the present application will be described below in detail with reference to the drawings.

First Embodiment

A configuration of a liquid crystal display 100 according to a first embodiment will now be described with reference to FIGS. 1 to 3. The first embodiment is an application of the application to a lateral field mode liquid crystal display 100.

Figure 1:
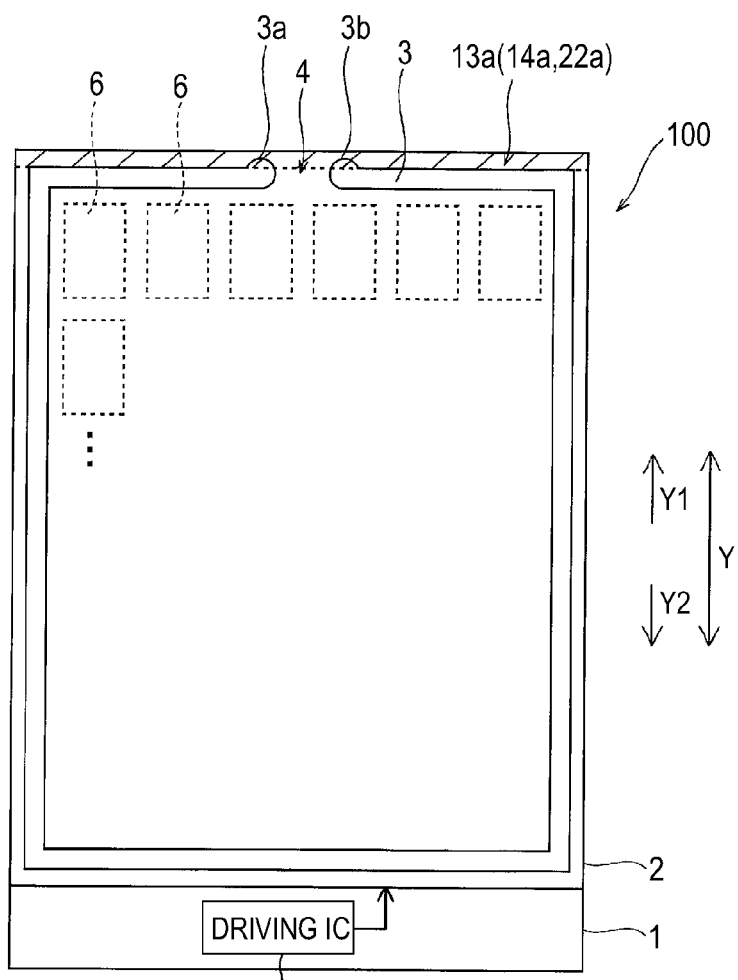
FIG. 1 is a plan view of a liquid crystal display according to a first embodiment.
Figure 2:
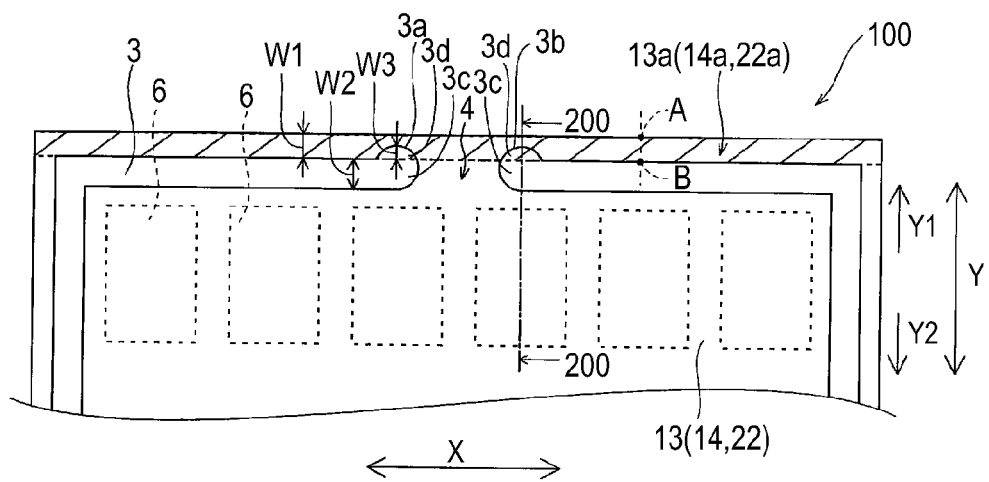
FIG. 2 is an enlarged plan view of the liquid crystal display according to the first embodiment.

As shown in FIG. 1, the liquid crystal display 100 according to the first embodiment includes a TFT substrate 1 having a substantially rectangular shape and an opposite substrate 2 having a substantially rectangular shape. The TFT substrate 1 is an example of the "first substrate" described above, and the opposite substrate 2 is an example of the "second substrate" described above. The TFT substrate 1 and the opposite substrate 2 are combined using a seal material 3. The seal material 3 is applied to the TFT substrate 1 or the opposite substrate 2 along the periphery thereof using a dispenser. The seal material 3 is applied to a surface of the TFT substrate 1 or the opposite substrate 2 such that the application is started at a start point 3a and completed at an end point 3b. A gap between the start point 3a and the end point 3b of the seal material 3 functions as a liquid crystal injection port 4 used for liquid crystal injection. A driving IC 5 for driving the liquid crystal display 100 is provided on a surface of the TFT substrate 1. The liquid crystal display 100 has a plurality of sub pixels 6.

Figure 3:
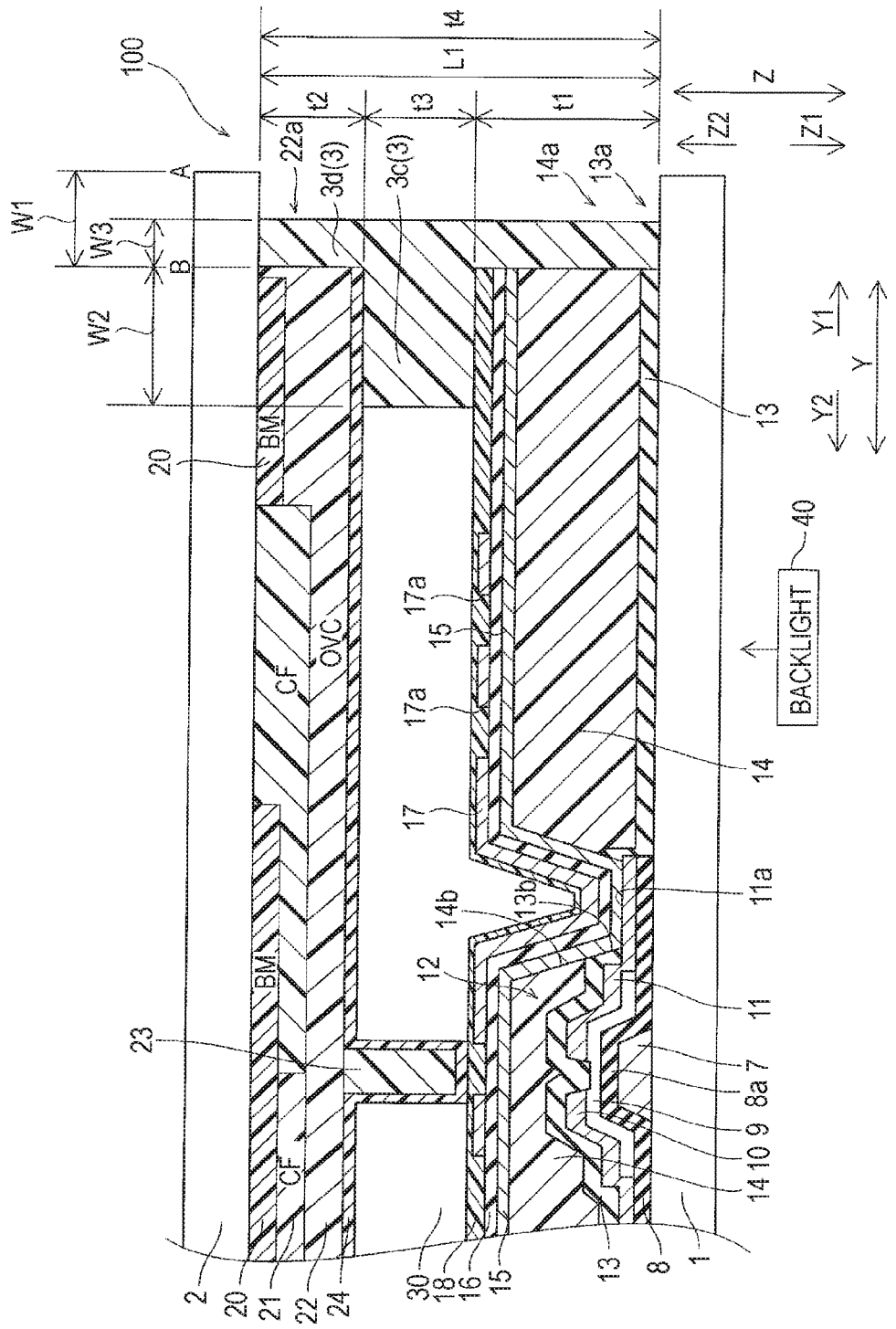
FIG. 3 is a sectional view taken along the line 200-200 in FIG. 2.

As shown in FIG. 3, the sub pixels 6 have a sectional structure in which a gate electrode 7 is formed on a surface of the TFT substrate 1. An insulation film 8 including a gate insulation film 8a made of SiN or the like is formed on the gate electrode 7 and the surface of the TFT substrate 1. A semiconductor layer 9 is formed to face the gate electrode 7 with the insulation layer 8 interposed between tem. The semiconductor layer 9 is made of a–Si and n+Si. A source electrode 10 and a drain electrode 11 are formed on the semiconductor layer 9. A thin film transistor 12 is formed by the fate electrode 7, the insulation layer 8, the semiconductor layer 9, the source electrode 10, and the drain electrode 11.

A passivation film 13 made of SiN or the like is formed so as to cover the source electrode 10 and the drain electrode 11. The passivation film 13 is an example of the "protective film" described above. In the first embodiment, a part (having a width W1) of the passivation film 13 is removed at one end thereof pointed by the arrow Y1 (the part between points A and B) to provide a relief portion 13a into which the seal material 3 can flow. As indicated by oblique lines in FIGS. 1 and 2, the relief portion 13a is provided by removing the passivation film 13 throughout the side of the area including panel regions (formed by the TFT substrate 1 and the opposite substrate 2) on which a liquid crystal injection port 4 is provided (the side of the apparatus indicated by the arrow Y1). Specifically, the relief portion 13a is provided such that it extends in the direction indicated by the arrow X between the periphery of the area including panel regions on the side indicated by the arrow Y1 and the seal material 3 when the display is viewed from above. The width W1 of the relief portion 13a of the passivation film 13 is in the range from about 0.1 μm to about 0.3 μm. As shown in FIG. 3, the passivation film 13 is formed with contact holes 13b.

A leveling film (OVL) 14 made of a photosensitive acryl resin is formed on a surface of the passivation film 13. The leveling film 14 is an example of the "first protective film" described above. In the first embodiment, a part (having a width W1) of the leveling film 14 is removed at the end thereof pointed by the arrow Y1 (the part between points A and B) to provide a relief portion 14a into which the seal material 3 can flow. As indicated by oblique lines in FIGS. 1 and 2, the relief portion 14a is provided by removing the leveling film 14 throughout the side of a region around the area including panel regions (formed by the TFT substrate 1 and the opposite substrate 2) on which the liquid crystal injection port 4 is provided (the side of the apparatus pointed by the arrow Y1). Specifically, the relief portion 14a is provided such that it extends in the direction indicated by the arrow X between the periphery of the area including panel regions on the side thereof indicated by the arrow Y1 and the seal material 3 when the display is viewed from above. The relief portion 14a of the leveling film 14 and the relief portion 13a of the passivation film 13 are provided on the surface of the TFT substrate 1 such that they overlap with each other when viewed from above. The width W1 of the relief portion 14a of the leveling film 14 is in the range from about 0.1 μm to about 0.3 μm. As shown in FIG. 3, the leveling film 14 is formed with contact holes 14b. The relief portion 14a of the leveling film 14 and the relief portion 13a of the passivation film 13 are formed flush with each other such that no step will be formed.

Pixel electrodes 15 constituted by transparent electrodes made of an ITO (indium tin oxide) or an IZO (indium zinc oxide) are formed on the surface of the leveling film 14. Each pixel electrode 15 is connected with the drain electrode 11 at a contact portion 11a through the contact hole 13b in the passivation film 13 and the contact hole 14b in the leveling film 14.

A low-temperature passivation film 16 made of SiN or the like is formed on the surface of the pixel electrode 15. A common electrode 17 constituted by a transparent electrode made of an ITO (indium tin oxide) or an IZO (indium zinc oxide) is formed on the surface of the low-temperature passivation film 16. The common electrode 17 has a plurality of slits 17a. An alignment film 18 constituted by an organic film such as polyimide is formed on the surface of the common electrode 17. The distance (a thickness t1) from surface of the TFT substrate 1 to the surface of the alignment film 18 is in the range from about 1.8 μm to about 2.2 μm.

The opposite substrate 2 is provided opposite to the TFT substrate 1. The TFT substrate 1 is disposed at an interval L1 of about 10 μm from the opposite substrate 2. A black matrix (BM) 20 made of a resin or the like is formed on a top surface of the opposite substrate 2.

Red (R), green (G), and blue (B) color filters (CFs) 21 are formed on a top surface of the black matrix 20. An overcoat layer (OVC) 22 made of an acryl type photosensitive resin and serving as a protective film is formed on top surfaces of the color filters 21. The overcoat layer 22 is an example of the "second protective film" and the "protective film" described above. In the first embodiment, a part (having a width W1) of the overcoat layer 22 at the end thereof pointed by the arrow Y1 (the part between points A and B) is removed to form a relief portion 22a into which the seal material 3 can flow. As indicated by oblique lines in FIG. 2, the relief portion 22a is a part of the overcoat layer 22 extending along the entire side of the region around the area including panel regions (formed by the TFT substrate 1 and the opposite substrate 2) on which the liquid crystal injection port 4 is provided (the side of the apparatus pointed by the arrow Y1). Specifically, the relief portion 22a is provided such that it extends in the direction indicated by the arrow X between the periphery of the area including panel regions on the side indicated by the arrow Y1 and the seal material 3 when the display is viewed from above. The relief portion 22a of the overcoat layer 22 is provided on the surface of the opposite substrate 2 such that it overlap with the relief portion 13a of the passivation film 13 and the relief portion 14a of the leveling film 14 when viewed from above. The width W1 of the relief portion 22a of the overcoat layer 22 is in the range from about 0.1 μm to about 0.3 μm.

As shown in FIG. 3, a photo spacer (PS) 23 made of a resin is formed on a top surface of the overcoat layer 22. The photo spacer 23 has the function of adjusting the cell gap (the distance between the TFT substrate 1 and the opposite substrate 2). An alignment film 24 made of polyimide or the like is formed on top surfaces of the photo spacer 23 and the overcoat layer 22. The distance (thickness t2) from the top surface of the opposite substrate 2 to a top surface of the alignment film 24 is in the range from about 2.8 μm to about 3.2 μm.

The seal material 3 applied between the TFT substrate 1 and the opposite substrate 2 is made of an epoxy type photo-curing resin. The seal material 3 includes seal portions 3c applied between the alignment film 18 and the alignment film 24 and pushed out portions 3d pushed out into the gap between the TFT substrate 1 and the opposite substrate 2. The seal pushed-out portions 3d are pushed into the relief portion 13a, the relief portion 14a, and the relief portion 22a between the TFT substrate 1 and the opposite substrate 2 whereas they are not pushed out beyond ends A of the TFT substrate 1 and the opposite substrate 2 in the direction indicated by arrow Y1. The seal pushed-out portions 3d do not spread to reach the ends of the TFT substrate 1 and the opposite substrate 2 in the direction indicated by the arrow Y1. Therefore, a space is left between the end of the seal pushed-out portions 3d in the direction Y1 and the ends of the TFT substrate 1 and the opposite substrate 2 in the direction Y1. The seal portions 3c have a thickness t3 in the range from about 3.8 μm to about 4.2 μm, and the seal portions 3c have a width W2 which is about 0.7 μm. The seal pushed-out portions 3d have a thickness t4 which is about 10 μm, and the seal pushed-out portions 3d have a width W3 which is about 0.1 μm. Therefore, the thickness t4 of the seal pushed-out portions 3d formed in the relief portions 13a, 14a, and 22a at the start point 3a and the end point 3b of the seal material 3 is greater than the thickness t3 of the seal portions 3c formed in regions where the relief portions 13a, 14a, and 22a are not provided.

A liquid crystal layer 30 is enclosed between the alignment film 18 and the alignment film 24. The liquid crystal layer 30 has the thickness t3 which is in the range from about 3.8 μm to about 4.2 μm. A backlight 40 is provided on the side of the TFT substrate 1 in the direction indicated by the arrow Z1. The backlight 40 is configured so as to emit light from the side of the TFT substrate 1 toward the side of the opposite substrate 2 (in the direction indicated by the arrow Z2).

Processes for manufacturing the liquid crystal display 100 according to the first embodiment will now be described with reference to FIG. 1 and FIGS. 3 to 14.

Figure 4:
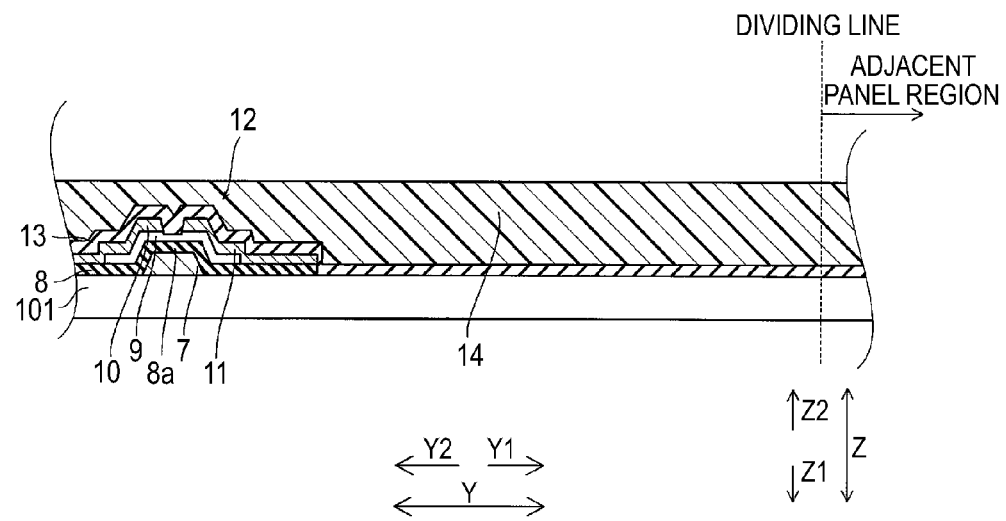
FIG. 4 is an illustration for explaining the step of forming a TFT (thin film transistor), a passivation film, and a leveling film (OVL) on a TFT substrate performed at a process of manufacturing the liquid crystal display according to the first embodiment.

First, as shown in FIG. 4, a lithographic technique and etching is carried out on a surface of a TFT substrate 101 in an undivided state to form gate electrodes 7 including a bottom layer which is an Al layer and a top layer which is a Mo layer. The TFT substrate 101 is an example of the "mother substrate" described above. A CVD (chemical vapor deposition) process is performed on the gate electrodes 7 and the TFT substrate 101 to form an insulation layer 8 including gate insulation films 8a constituted by SiN films or the like. Photolithography and etching is carried out to form semiconductor layers 9 having two-layer structure formed by an a–Si layer and an $n^+$ Si layer of the n conductivity type on the gate electrodes 7 with the gate insulation films 8a interposed such that the layers overlap each other when viewed from above.

Next, source electrodes 10 and drain electrodes 11 each including a bottom layer made of Mo, a middle layer made of Al, and a top layer made of Mo are formed on the semiconductor layers 9 such that they overlap the gate electrodes 7 and the semiconductor layers 9 when viewed from above, the source and drain electrodes being electrically connected to the semiconductor layers 9. Thus, thin film transistors 12 are formed. Next, a CVD process is performed to form passivation films 13 to serve as protective films made of SiN films or the like so as to cover the source electrodes 10, the drain electrodes 11, and the insulation films 8.

Figure 5:
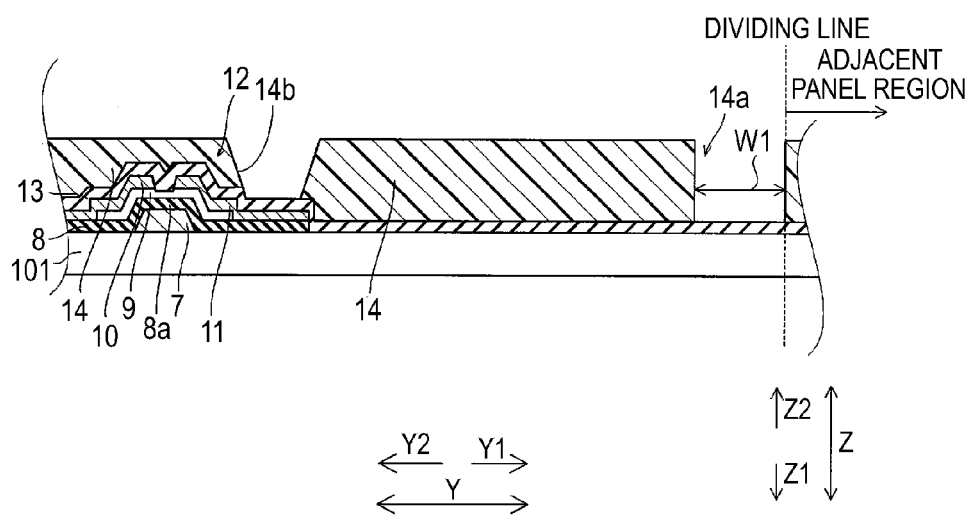
FIG. 5 is an illustration for explaining the step of forming a relief portion and a contact hole in a leveling film (OVL) performed at a process of manufacturing the liquid crystal display according to the first embodiment.

Next a coating process is performed to form a leveling film 14 to serve as a protective film made of an acryl type photosensitive resin on a top surface of the passivation layer 13. In the first embodiment, as shown in FIG. 5, photolithography is carried out to remove a part of the leveling film 14 at the end thereof in the direction indicated by the arrow Y1. Specifically, a part of the leveling film 14 extending from the border with an adjacent panel region (dividing line) in the direction indicated by the arrow Y2 is removed, the part having a width W1 in the range from about 0.1 μm to about 0.3 μm. A relief portion 14a is formed between the periphery of an area including panel regions on the side thereof indicated by the arrow Y1 and the seal material 3. The leveling film 14 formed of the top surface of the drain electrodes 11 of TFTs 4 is removed using photolithography at the same time when the relief portion 14a is formed. Thus, contact holes 14b are formed.

Figure 6:
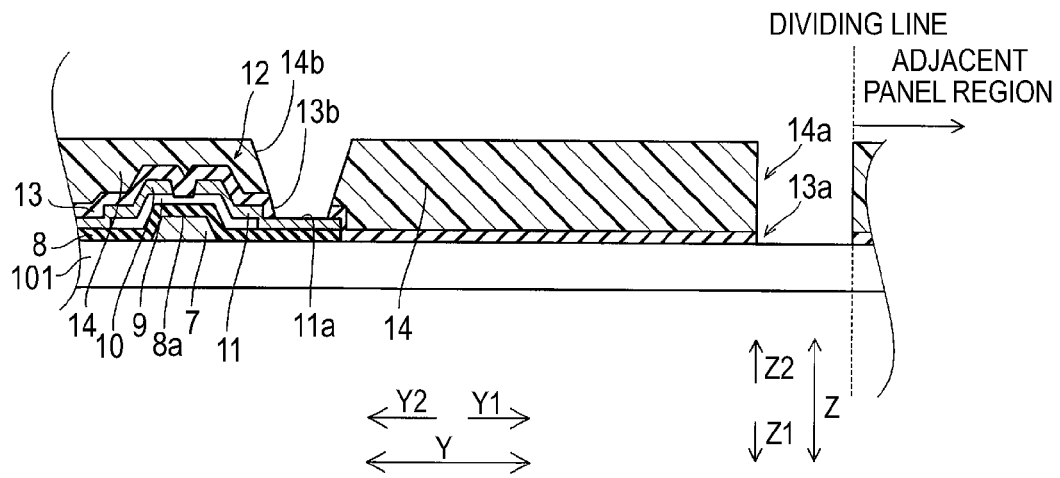
FIG. 6 is an illustration for explaining the step of forming a relief portion in a passivation film performed at a process of manufacturing the liquid crystal display according to the first embodiment.

Next, as shown in FIG. 6, a part of the passivation film 13 is etched to form a relief portion 13a in a position associated with the relief portion 14a. The relief portion 13a is formed between the periphery of the area including panel regions on the side indicated by the arrow Y1 and the seal member 3 when viewed from above. At the same time when the relief portion 13a is formed, contact holes 13b are formed in the passivation film 13 formed on top surfaces of the drain electrodes 11 of the TFT 4. Thus, the top surfaces of the drain electrodes 11 are exposed.

Figure 7:
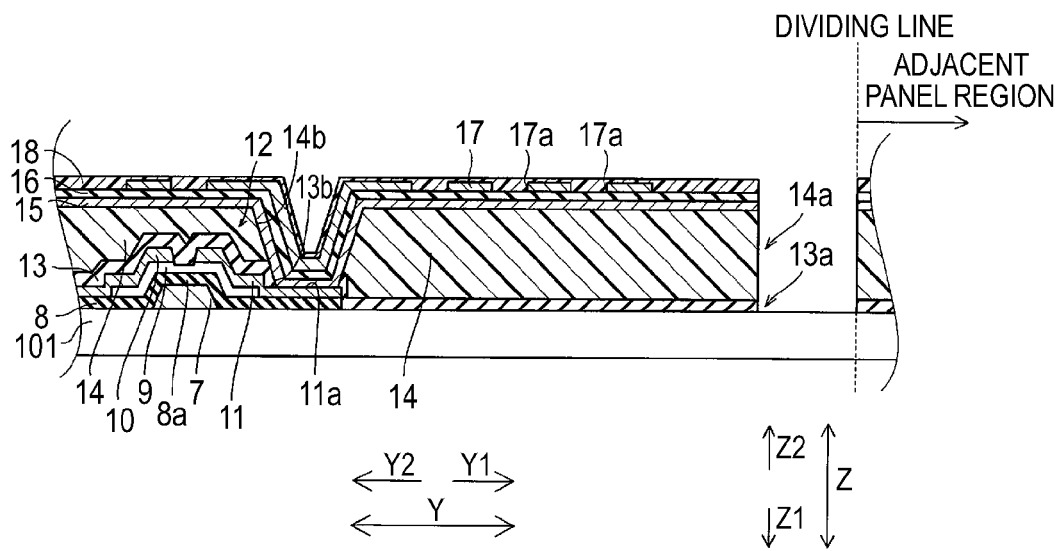
FIG. 7 is an illustration for explaining the step of forming a pixel electrode, a low-temperature passivation film, a common electrode, and an alignment film on a surface of a leveling film (OVL) performed at a process of manufacturing the liquid crystal display according to the first embodiment.

Next, as shown in FIG. 7, sputtering process is performed to form pixel electrodes 15 made of an ITO or IZO on a top surface of the leveling film 14. At this time, a part of each pixel electrode 15 is electrically connected to the drain electrode 11 at a contact portion 11a through the contact holes 13b and 14b.

A low-temperature passivation film 16 constituted by a SiN film is formed on the top surfaces of the pixel electrode 15 using CVD process. A common electrode 17 made of a ITO or IZO is formed on a top surface of the low-temperature passivation film 16 using sputtering. The common electrode 17 is formed with a plurality of slits 17a. A liquid crystal is aligned by electric fields generated between the pixel electrodes 15 and the common electrode 17 with the low temperature passivation film 16 interposed between them. Thus, the liquid crystal display 100 is driven. Next, a coating process is performed to form an alignment film 18 made of polyimide or the like on a top surface of the common electrode 17. Thus, a TFT substrate 101 of the liquid crystal display 100 is formed. Referring to FIG. 7, the pixel electrode 15 and the alignment film 18 are formed up to the ends of the passivation film 13 and the leveling film 14 in the position of the relief portions 13a and 14a. It is not essential that the pixel electrode 15 and the alignment film 18 are formed to extend up to such a position. What is required at least is to form the pixel electrode and the alignment film up to the end of a display area where sub-pixels 6 (see FIG. 1) are provided.

Figure 8:
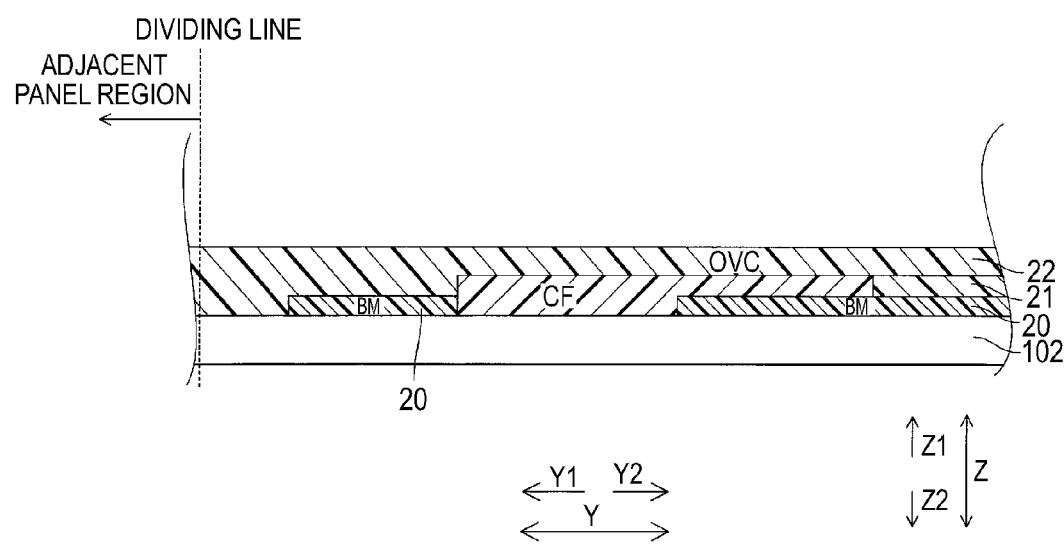
FIG. 8 is an illustration for explaining the step of forming a black matrix, color filters, and an overcoat (OVC) layer on an opposite substrate, performed at a process of manufacturing the liquid crystal display according to the first embodiment.

Next, as shown in FIG. 8, a film made of, for example, a black resin material is formed on a surface of an opposite substrate 102 in an undivided state, and the resin material is etched to form a black matrix (BM) 20. The opposite substrate 102 is an example of the "second mother substrate" described above. Thereafter, red (R), green (G), and blue (B) color filters (CFs) 21 are formed at each sub pixel 6 (see FIG. 1) using photolithography.

Next, an overcoat layer (OVC) 22 made of an acryl type photosensitive resin is formed on top surfaces of the black matrix 20 and the color filters 21 using a coating process. The overcoat layer 22 is formed to cover the substantially entire top surfaces of the black matrix 20 and the color filters 21.

Figure 9:
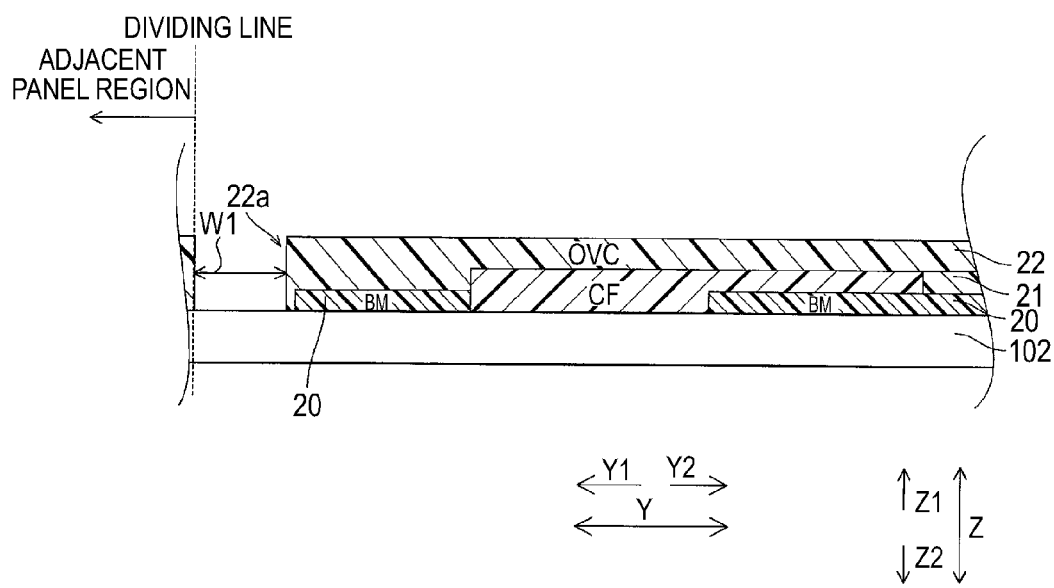
FIG. 9 is a sectional view for explaining the step of forming a relief portion in the overcoat layer performed at a process of manufacturing the liquid crystal display according to the first embodiment.

In the first embodiment, as shown in FIG. 9, a part of the overcoat layer 22 extending from the border with an adjacent panel region (dividing line) in the direction indicated by the arrow Y2 is removed using photolithography, the part having a width W1 in the range from about 0.1 μm to about 0.3 μm. Thus, a relief portion 22a is formed. The relief portion 22a is formed between the periphery of the area including panel regions on the side thereof indicated by the arrow Y1 and the seal material 3 when viewed from above.

Figure 10:
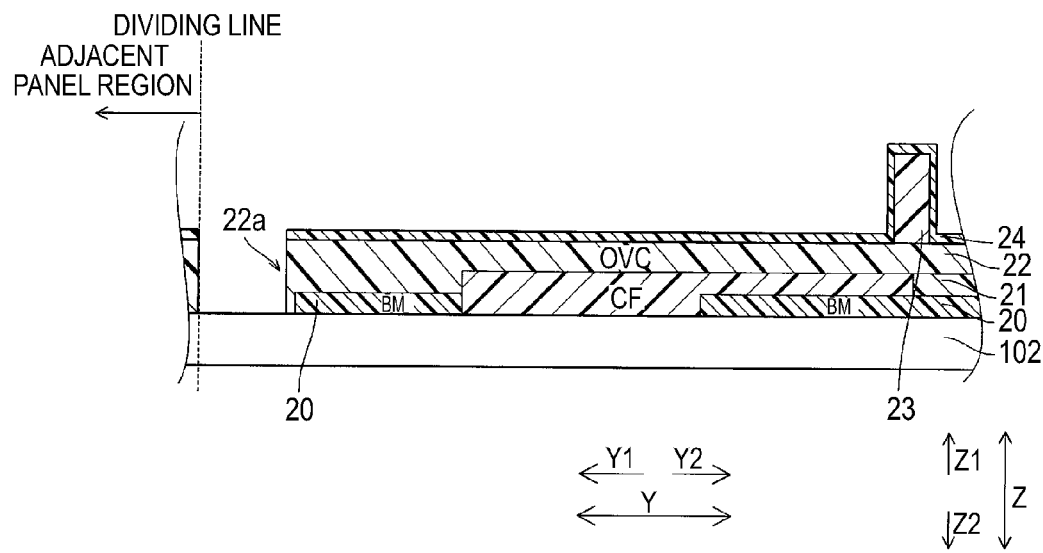
FIG. 10 is an illustration for explaining the step of forming a photo spacer (PS) and an alignment film on a surface of the overcoat layer performed at a process of manufacturing the liquid crystal display according to the first embodiment.

Next, as shown in FIG. 10, a photo spacer 23 made of a acryl type photosensitive resin is formed on a top surface of the overcoat layer 22 using photolithography. Thereafter, an alignment film 24 made of polyimide or the like is formed o top surfaces of the overcoat layer 22 and the photo spacer 23. Thus, the opposite substrate 102 of the liquid crystal display 100 is formed.

Figure 11:
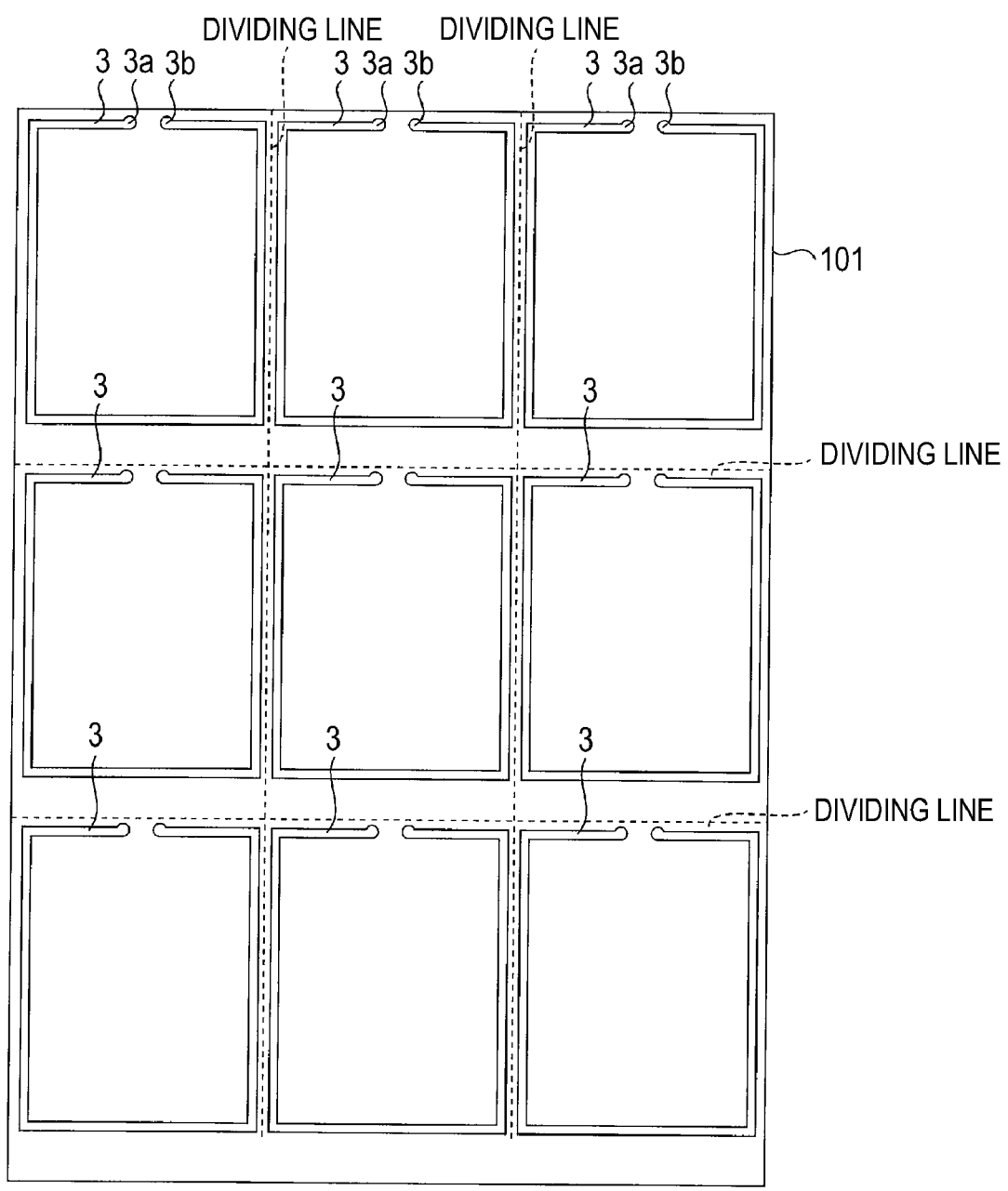
FIG. 11 is an illustration for explaining the step of applying a seal material to the TFT substrate performed at a process of manufacturing the liquid crystal display according to the first embodiment.
Figure 12:
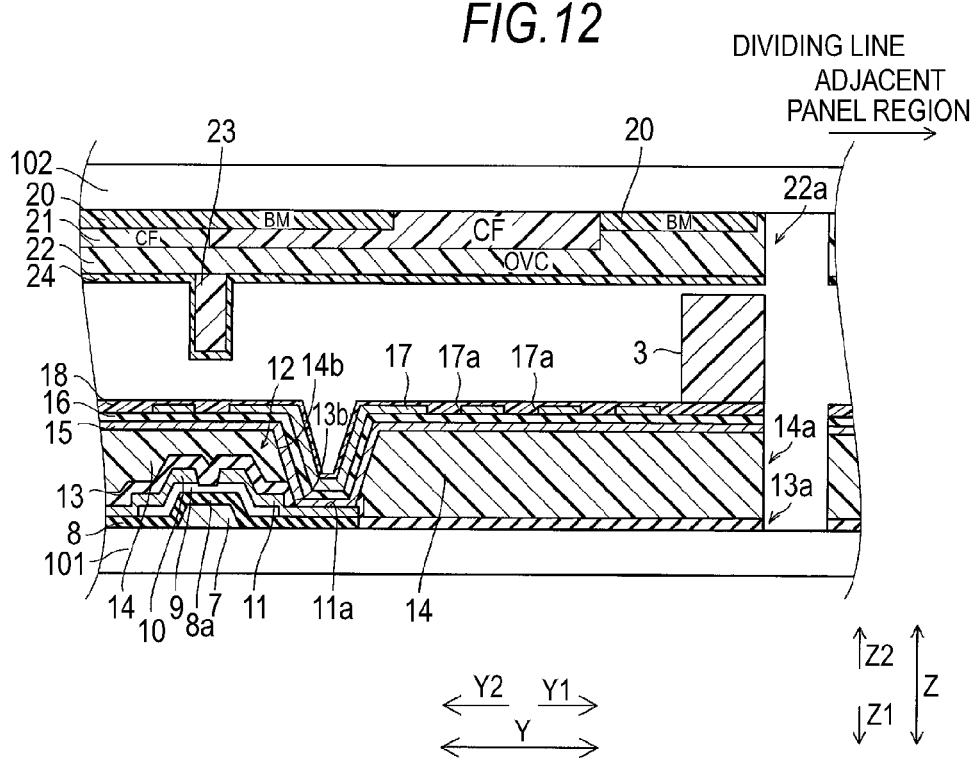
FIG. 12 is an illustration for explaining the step of combining the TFT substrate and the opposite substrate performed at a process of manufacturing the liquid crystal display according to the first embodiment.

Next, as shown in FIG. 11, a seal material 3 is applied to each panel using a dispenser to form a gap to serve as a liquid crystal injection port 4, the application starting at a start point 3a and ending at an end point 3b. The seal material 3 is applied substantially in the form of a rectangular when viewed from above. As shown in FIG. 12, the seal material 3 is applied to a top surface of the alignment film 18 which resides on the leveling film 14 of the TFT substrate 101.

Figure 13:
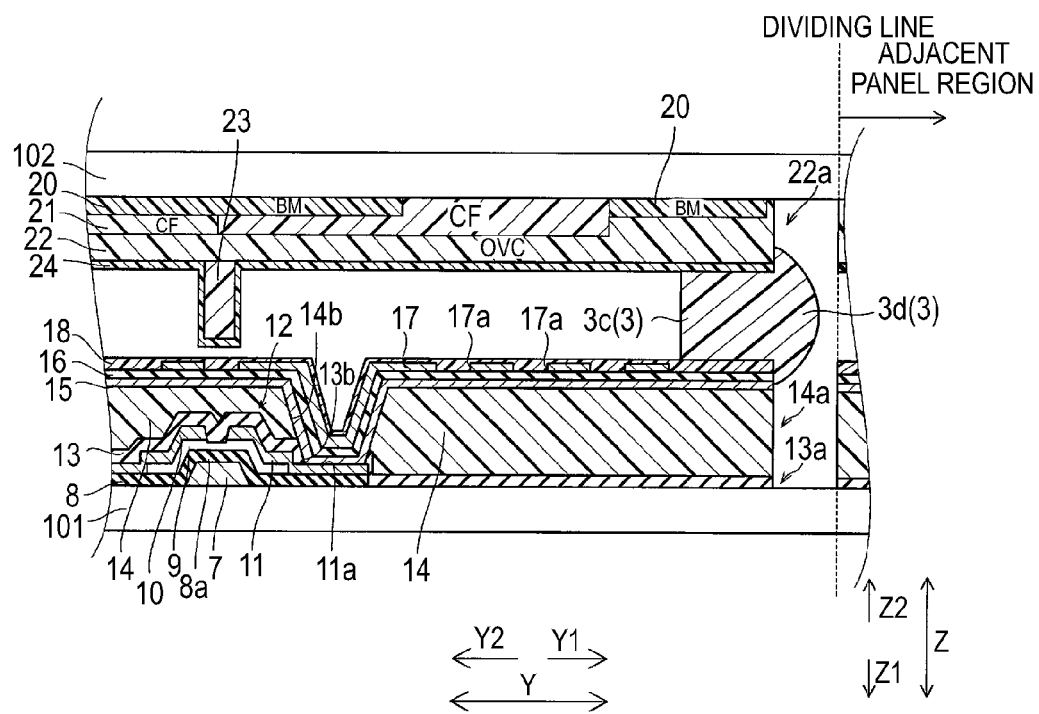
FIG. 13 is an illustration for explaining the step of combining the TFT substrate and the opposite substrate performed at the process of manufacturing the liquid crystal display according to the first embodiment.

As shown in FIG. 13, the TFT substrate 101 and the opposite substrate 102 are combined. At this time, when the seal material 3 comes into contact with the alignment film 24 of the opposite substrate 102, the seal material 3 is spread in the direction Y by the alignment film 18 of the TFT substrate 101 and the alignment film 24 of the opposite substrate 102. When the seal material 3 is applied using a dispenser as in the first embodiment, the seal material may be deposited in regions including the start point 3a and the end point 3b. The amount (thickness) of the seal material 3 in the regions including the start point 3a and the end point 3b tends to become greater the amount (thickness) of the seal material 3 in regions other than the regions including the start point 3a and the end point 3b. That is, the seal material 3 in the regions including the start point 3a and the end point 3b is spread in an amount greater than the amount of the seal material 3 spread in the regions other than the regions including the start point 3a and the end point 3b. The seal material 3 spread as thus described enters the relief portion 13a, the relief portion 14a, and the relief portion 22a.

Figure 14:
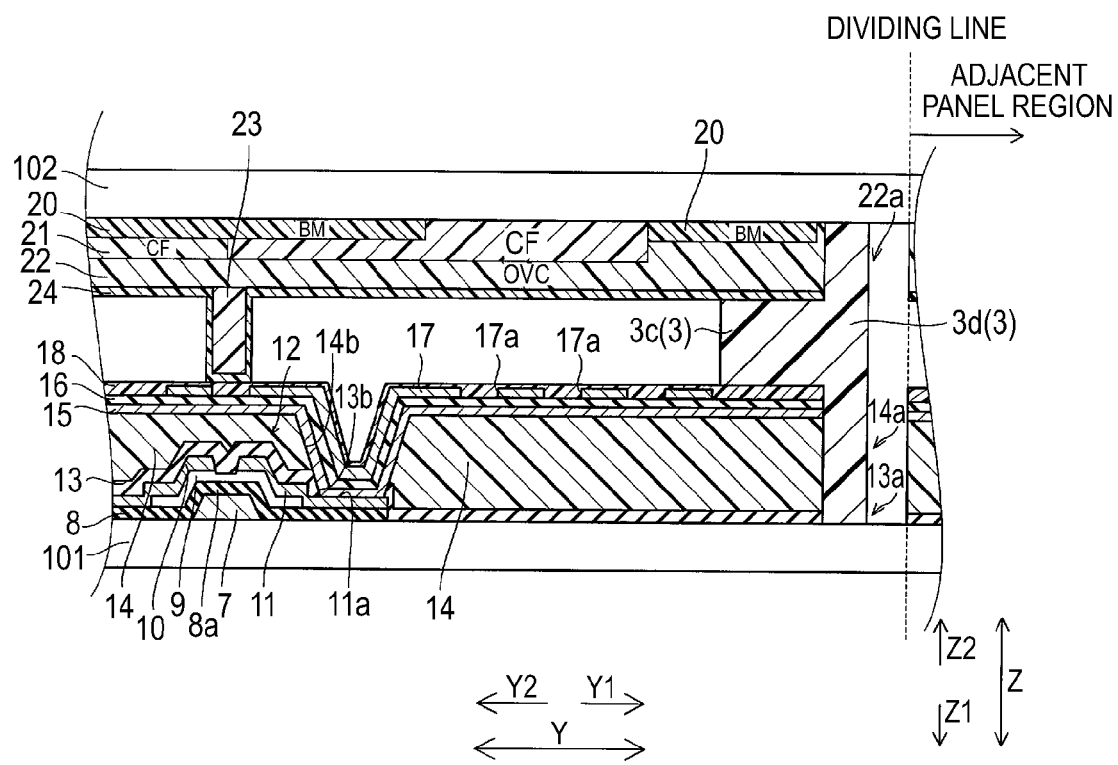
FIG. 14 is an illustration for explaining the step of combining the TFT substrate and the opposite substrate performed at the process of manufacturing the liquid crystal display according to the first embodiment.

Thereafter, as shown in FIG. 14, when the alignment film 24 on the photo spacer 23 is put into contact with the alignment film 18 of the TFT substrate 101 to adjust the cell gap between the TFT substrate 101 and the opposite substrate 102, seal pushed-out portions 3d of the seal material 3 enter the relief portion 13a, the relief portion 14a, and the relief portion 22a and do not spread (are not pushed out) into an adjacent panel region. At this time, the seal pushed-out portions 3d do not spread up to the ends of the TFT substrate 101 and the opposite substrate 102 in the direction Y1, and a space (clearance) is left between the end of the seal pushed-out portion 3d in the direction Y1 and the ends of the TFT substrate 101 and the opposite substrate 102 in the direction Y1. Thereafter, the seal material 3 is cured by irradiating it with ultraviolet rays to bond (fix) the TFT substrate 101 and the opposite substrate 102.

Next, the TFT substrate 101 and the opposite substrate 102 are divided into individual panels. A liquid crystal is injected into a gap between the TFT substrate 101 and the opposite substrate 102. Thereafter, a liquid crystal injection port 4 is sealed by a sealant such as a photo-curing resin. A driving IC 5 and a backlight 40 are mounted to complete a lateral field mode liquid crystal display 100 (see FIG. 3).

In the first embodiment, as described above, regions of the passivation film 13, the leveling film 14, and the overcoat layer 22 which are associated with the start point 3a and the end point 3b of the seal material 3 and which are near the periphery of an area including panel regions are removed. When the TFT substrate 101 and the opposite substrate 102 are combined, the seal material 3 spread by the TFT substrate 101 and the opposite substrate 102 enters the relief portion 13a of the passivation film 13, the relief portion 14a of the leveling film 14, and the relief portion 22a of the overcoat layer 22. Therefore, when the seal material 3 is applied using a dispenser, it is possible to prevent the seal material from being pushed out into an adjacent panel region at least at the start point and the end point where the seal material 3 is likely to be pushed out of place as a result of deposition of a great amount of the material. Unlike the use of an extra structure for preventing the seal material 3 from being pushed out into an adjacent panel region by being spread by the TFT substrate 101 and the opposite substrate 102, the same effect can be achieved by only removing parts of the passivation film 13, the leveling film 14, and the overcoat layer 22 without a complicated structure.

According to the first embodiment, as described above, parts of the leveling film 14 and the overcoat layer 22 can be removed using photolithography to remove desired portions of the leveling film 14 and the overcoat layer 22 (the relief portions 14a and 22a) easily.

In the first embodiment, as described above, the TFT substrate 101 and the opposite substrate 102 are combined after removing regions of the passivation film 13, the leveling film 14, and the overcoat layer 22 which are associated with the entire side of an area including individual panels on which the liquid crystal injection port 4 is provided and which are near the periphery of the area including panel regions. When the substrates are combined, the seal material 3 spread by the TFT substrate 101 and the opposite substrate 102 flows into the relief portion 13a of the passivation film 13, the relief portion 14a of the leveling film 14, and the relief portion 22a of the overcoat layer 22 associated with the side of the area including individual panel regions on which the liquid crystal injection port 4 is provided. The seal material 3 can be made to flow into the relief portions 13a, 14a, and 22a not only from the regions near the start point 3a and the end point 3b but also from the entire region along the side on which the liquid crystal injection port 4 is provided. It is therefore possible to prevent the seal material 3 from being pushed out from the neighborhood of the periphery throughout the side on which the liquid crystal injection port 4 is provided.

In the first embodiment, as described above, the thickness t4 of the regions in the relief portion 13a of the passivation film 13, the relief portion 14a of the leveling film 14, and the relief portion 22a of the overcoat layer 22 at the start point 3a and the end point 3b of the seal material 3 is greater than the thickness t3 of the seal material 3 formed in regions where the relief portion 13a of the passivation film 13, the relief potion 14a of the leveling film 14, and the relief portion 22a of the overcoat layer 22 are not provided. Since the thickness t4 of the regions having the relief portions 13a, 14a, and 22a formed therein are greater as thus described, a greater amount of the seal material 3 can be made to flow into the relief portions 13a, 14a, and 22a associated with the start point and the end point of the seal material 3. Therefore, the seal material 3 can be easily prevented from being pushed out at the start point 3a and the end point 3b of the seal material 3.

Second Embodiment

A second embodiment will now be described with reference to FIG. 15. The second embodiment is different from the first embodiment as follows. The relief portions 13a, 14a, and 22a of the first embodiment are provided throughout the side of an area including panel regions on which the liquid crystal injection port is provided, whereas relief portions 113a, 114a, and 122a according to the second embodiment are formed in regions on the side of an area including panel regions other than a region in which a liquid crystal injection port 4 is provided.

Figure 15:
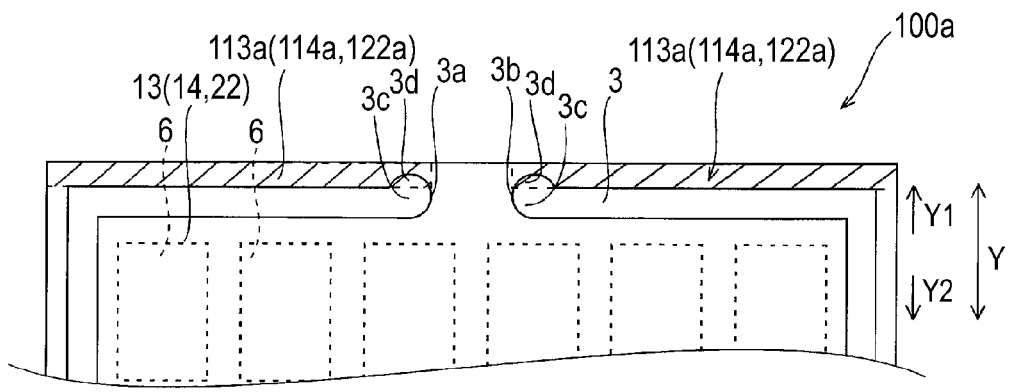
FIG. 15 is an enlarged plan view of a liquid crystal display according to a second embodiment.

In a liquid crystal display 100a according to the second embodiment, as shown in FIG. 15, the relief portions 113a, 114a, and 122a are provided in regions (indicated by oblique lines in FIG. 15) of a passivation film 13, a leveling film 14, and an overcoat layer 22, respectively, other than a region of the associated with a liquid crystal injection port 4 near the periphery of the display on the side thereof indicated by the arrow Y1. Specifically, the relief portions 113a, 114a, and 122a are provided between the periphery of an area including panel regions on the side of thereof indicated by the arrow Y1 and a seal material 3, when viewed from above. The relief portions 113a, 114a, and 122a are not provided between the periphery of the area including panel regions on the side of the area indicated by the arrow Y1 and a liquid crystal injection port 4. The configuration and manufacturing method of the second embodiment is otherwise similar to the above-described first embodiment.

In the second embodiment, as described above, the passivation film 13, the leveling film 14, and the overcoat layer 22 are removed in regions which extend throughout the side of an area including individual panels on which the liquid crystal injection port 4 is provided and which are near the periphery of the area including panel regions, the removed regions excluding the region associated with the liquid crystal injection port 4 formed between the start point 3*a* and the end point 3*b* of the seal material 3. Thus, the size of the opening of the liquid crystal injection port 4 can be kept small compared to the size that the opening has when the passivation film 13, the leveling film 14, and the overcoat layer 22 are removed in the region associated with the liquid crystal injection port 4. Thus, a sealant used for sealing the liquid crystal injection port 4 can be prevented from flowing up to an undesirable depth in the liquid crystal injection port 4. As a result, the liquid crystal can be prevented from being disturbed by a flow of the sealant to an undesirable depth in the liquid crystal injection port 4.

The advantage of the second embodiment is otherwise the same as that of the first embodiment.

Third Embodiment

A third embodiment will now be described with reference to FIG. 16. The third embodiment is different from the first embodiment as follows. The relief portions 13*a*, 14*a*, and 22*a* of the first embodiment are provided throughout the side of the area including panel regions on which the liquid crystal injection port 4 is provided, whereas relief portions 213*a*, 214*a*, and 222*a* according to the third embodiment are formed by removing regions of a passivation film 13, a leveling film 14, and an overcoat layer 22 associated with a start point 3*a* and an end point 3*b* of a seal material 3.

Figure 16:
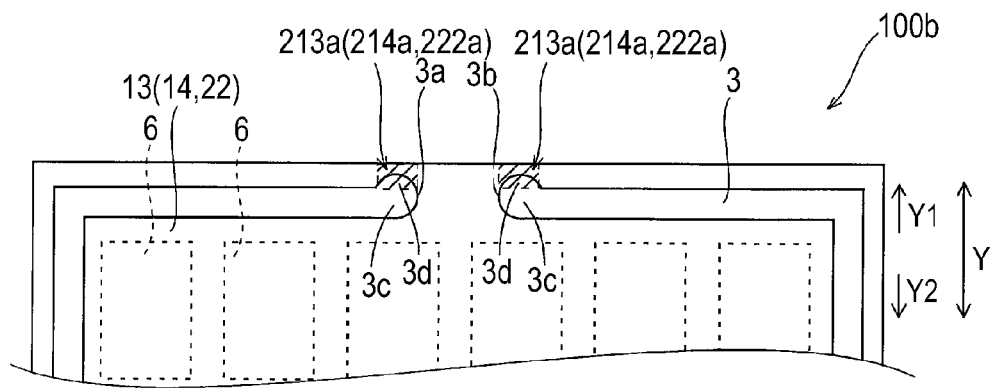
FIG. 16 is an enlarged plan view of a liquid crystal display according to a third embodiment.

In a liquid crystal display 100*b* according to the third embodiment, as shown in FIG. 16, relief portions 213*a*, 214*a*, and 222*a* are provided only in respective regions (indicated by oblique lines in FIG. 16) of a passivation film 13, a leveling film 14, and an overcoat layer 22 associated with a start point 3*a* and an end point 3*b* of a seal material 3 in the neighborhood of the periphery of the display on the side thereof indicated by the arrow Y1. That is, the relief portions 213*a*, 214*a*, and 222*a* are not provided in regions of the passivation film 13, the leveling film 14, and the overcoat layer 22 other than the regions associated with the start point 3*a* and the end point 3*b* of the seal material 3 in the neighborhood of the periphery of the display on the side thereof indicated by the arrow Y1. Specifically, the relief portions 213*a*, 214*a*, and 222*a* are provided only between the periphery of the area of the panel regions on the side thereof indicated by the arrow Y1 and the start point 3*a* and the end point 3*b* of the seal material 3, when he display is viewed from above. The configuration and the manufacturing method of the third embodiment are otherwise similar to those of the first embodiment described above.

In the third embodiment, as described above, the passivation film 13, the leveling film 14, and the overcoat layer 22 are partially removed in regions thereof which are associated with the start point 3*a* and the end point 3*b* of the seal material 3 and which are near the periphery of the area including the panel regions. As a result, when the TFT substrate 101 and the opposite substrate 102 are combined, the seal material 3 flows into the relief portions 213*a* of the passivation film 13 the relief portions 214*a* of the leveling film 14, and the relief portions 222*a* of the overcoat layer 22 only from the start point 3*a* and the end point 3*b* where the seal material 3 is likely to be pushed out of place as a result of deposition of a great amount of the material. It is therefore possible to prevent the seal material 3 from being pushed out from the start point 3*a* and the end point 3*b* into the panel region adjacent to the same.

The advantage of the third embodiment is otherwise similar to the advantage of the first embodiment.

Fourth Embodiment

A fourth embodiment will now be described with reference to FIG. 17. The fourth embodiment is different as described below from the first embodiment in which the relief portions 13*a*, 14*a*, and 22*a* are formed throughout the side of the area of panel regions on which the liquid crystal injection port 4. Relief portions 313*a*, 314*a*, and 322*a* are formed by removing a start point 3*a* and an end point 3*b* of a seal material 3 and regions associated with a liquid crystal injection port 4 formed between the start point 3*a* and the end point 3*b* of the seal material 3.

Figure 17:
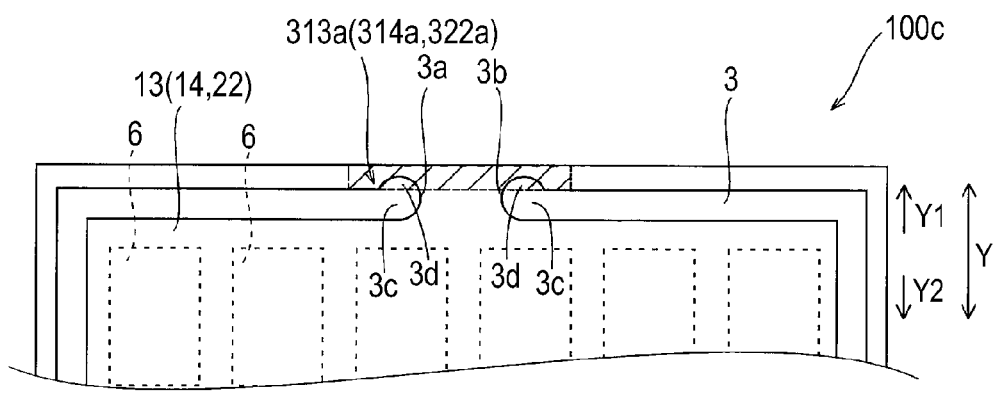
FIG. 17 is an enlarged plan view of a liquid crystal display according to a fourth embodiment.

In a liquid crystal display 100*c* according to the fourth embodiment, as shown in FIG. 17, relief portions 313*a*, 314*a*, and 322*a* are provided in regions of a passivation film 13, a leveling film 14, and an overcoat layer 22 associated with a start point 3*a* and an end point 3*b* of a seal material 3 near the periphery of the display on the side thereof indicated by the arrow Y1 (regions indicated by oblique lines in FIG. 17). The relief portions are also provide in regions of the passivation film 13, the leveling film 14, and the overcoat layer 22 associated with a liquid crystal injection port 4 formed between the start point 3*a* and the end point 3*b* of the seal material 3 (regions indicated by oblique lines in FIG. 17). Specifically, the relief portions 313*a*, 314*a*, and 322*a* are provided in regions between the periphery of the area including panel regions on the side thereof indicated by the arrow Y1 and the start point 3*a* and the end point 3*b* of the seal material 3, and the relief portions also extend in the region between the periphery of the area including panel regions on the side thereof indicated by the arrow Y1 and the liquid crystal injection port 4 formed between the start point 3*a* and the end point 3*b* of the seal material 3, when the display is viewed from above. The configuration and manufacturing method of the fourth embodiment are otherwise similar to those of the first embodiment described above.

In the fourth embodiment, as described above, the passivation film 13, the leveling film 14, and the overcoat layer 22 are partially removed in the regions which are associated with the start point 3*a* and the end point 3*b* of the seal material 3 and the liquid crystal injection port 4 formed between the start point 3*a* and the end point 3*b* and which are near the periphery of the area including panel regions. As a result, when the TFT substrate 101 and the opposite substrate 102 are combined, the seal material 3 spread by the TFT substrate 101 and the opposite substrate 102 can be prevented from being pushed out from the neighborhood of the periphery of the area including panel regions even if the seal material flows into the liquid crystal injection port 4 at the periphery of the area including panel regions.

The advantage of the fourth embodiment is otherwise similar to the advantage of the first embodiment described above.

Figure 18:
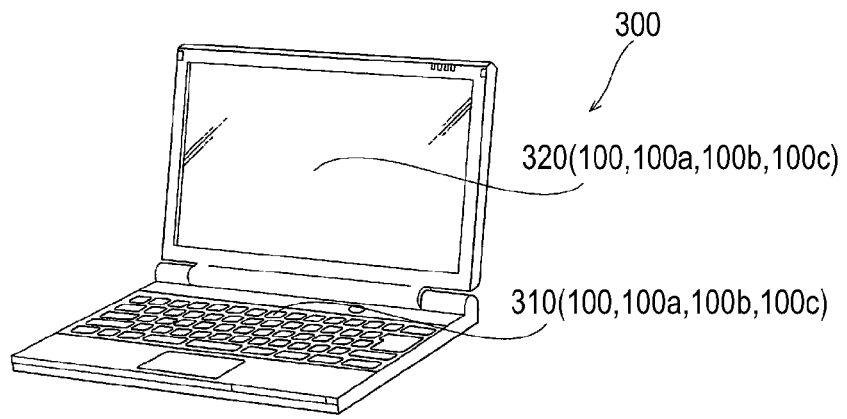
FIG. 18 is an illustration for explaining a first example of an electronic apparatus utilizing a liquid crystal display according to any of the first to fourth embodiments.
Figure 19:
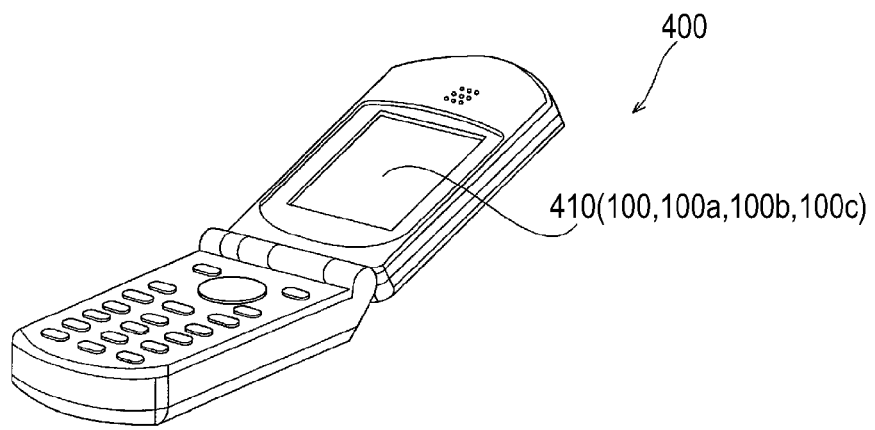
FIG. 19 is an illustration for explaining a second example of an electronic apparatus utilizing a liquid crystal display according to any of the first to fourth embodiments.
Figure 20:
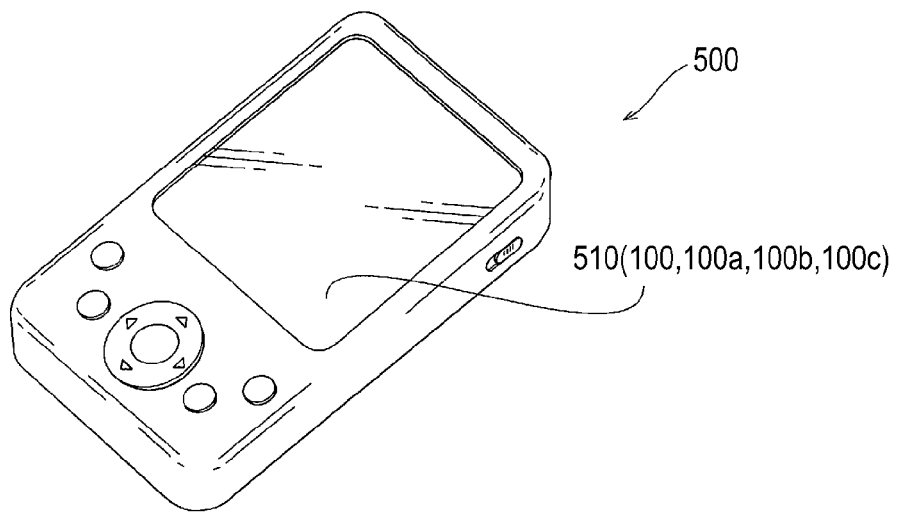
FIG. 20 is an illustration for explaining a third example of an electronic apparatus utilizing a liquid crystal display according to any of the first to fourth embodiments.

FIGS. 18 to 20 are illustrations for explaining first, second, and third examples of electronic apparatus employing liquid crystal displays 100, 100*a*, 100*b*, and 100*c* according to the first to fourth embodiments. The electronic apparatus employing liquid crystal displays 100, 100*a*, 100*b*, and 100*c* according to the first to fourth embodiments will now be described with reference to FIGS. 18 to 20.

The liquid crystal displays 100, 100*a*, 100*b*, and 100*c* according to the first to fourth embodiments may be used in a personal computer (PC) 300 as a first example, a mobile phone 400 as a second example, and a personal digital assistant (PDA) 500 as a third example, as shown in FIGS. 18 to 20.

In the PC 300 as a first example shown in FIG. 18, the liquid crystal displays 100, 100a, 100b, and 100c according to the first to fourth embodiments may be used as an input section 310 such as a keyboard, a display screen 320, and the like. In the mobile phone 400 as a second example shown in FIG. 19, any of the liquid crystal displays 100, 100a, 100b, and 100c according to the first to fourth embodiments may be used as a display screen 410. In the personal digital assistant 500 as a third example shown in FIG. 20, any of the liquid crystal displays 100, 100a, 100b, and 100c according to the first to fourth embodiments may be used as a display screen 510.

The embodiments disclosed hereinbefore should be construed as being examples in every aspects and should not be construed to limit the application in any way. The scope of the application is interpreted in view of the appended claims rather than the embodiments described above, and includes equivalents and all alternations within in the scope of the appended claims.

For example, the first to fourth embodiments have been described as examples of application of the application to a lateral field mode liquid crystal display, but the application is not limited to such displays. For example, the application may be applied to liquid crystal displays of types other than lateral field mode displays.

While the above-described first to fourth embodiments are examples involving the step of removing part of a leveling film and an overcoat layer using a photolithographic technique, the application is not limited to such examples. For example, etching may alternatively be used to remove part of a leveling film and an overcoat layer.

In the above description of the first to fourth embodiments, examples of a step for forming relief portions on surfaces of both of a TFT substrate and an opposite substrate, the application is not limited to such examples. For example, a relief portion may be provided only on a surface of either the TFT substrate or the opposite substrate. Although a relief portion is formed also in the passivation film on the TFT substrate in the above-described embodiments, a relief portion may alternatively be formed only in the leveling film. In either case, it is advantageous to form a relief portion in the protective film which has the greatest thickness among the films on the TFT and opposite substrates in achieving the advantage of the embodiments, i.e., preventing the seal material from being pushed out at the start point and the end point thereof.

Figure 21:
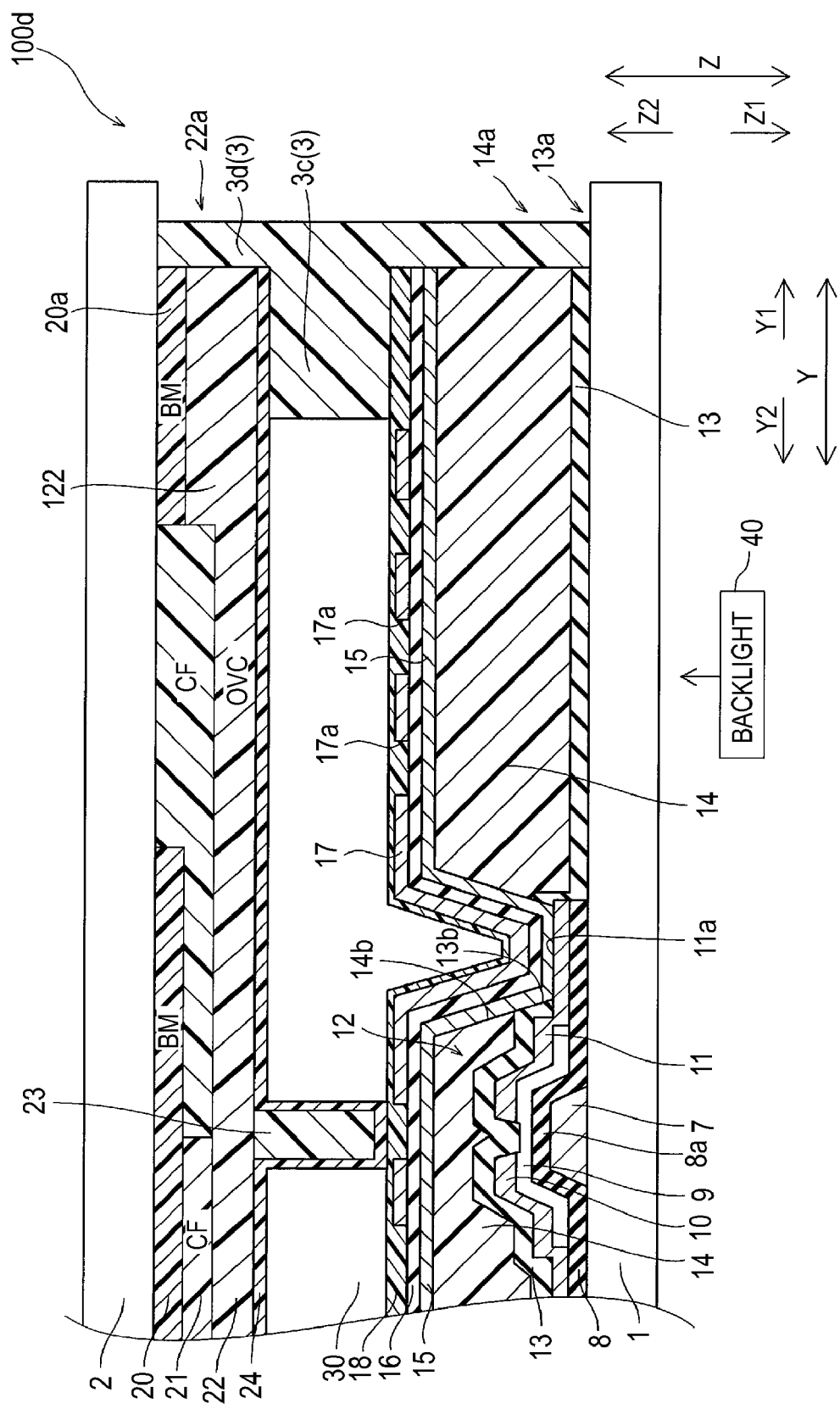
FIG. 21 is an illustration for explaining a modification of a liquid crystal display according to any of the first to fourth embodiments.

In the first to fourth embodiments have been described as examples in which an overcoat layer is formed to cover a black matrix formed near edges of an opposite substrate, but the application is not limited to such examples. For example, as seen in a liquid crystal display 100d shown in FIG. 21 which is a modification of the first to fourth embodiments, an overcoat layer 122 may have a relief portion 22a formed flush with an edge of a black matrix 20a formed near the end of an opposite substrate in the direction indicated by the arrow Y1 such that no step is formed between the relief portion and the substrate edge.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A method manufacturing a liquid crystal display comprising:
    forming a protective film on at least either of a first mother substrate and a second mother substrate which are disposed opposite to each other and each of which has a plurality of panel regions;
    removing the protective film in a region which is associated with at least a start point and an end point of a seal material and which is near the periphery of an area including the panel regions,
    applying the seal material to the protective film on the first mother substrate and the second mother substrate in the vicinity of dividing lines at which the mother substrates are divided into individual panel regions using a dispenser, the seal material being applied from the start point to the end point to form a gap to serve as a liquid crystal injection port;
    combining the first mother substrate and the second mother substrate; and
    dividing the combined first mother substrate and the second mother substrate into the individual panel regions.

2. A method of manufacturing a liquid crystal display according to claim 1, wherein
    forming the protective film includes forming the protective filmm a photosensitive material; and
    removing the protective film includes moving a part of the protective film using a photolithographic technique.

3. A method of manufacturing a liquid display according to claim 1, wherein
    each panel region has a substantially rectangular shape when viewed from above;
    the step of applying the seal material includes applying the seal material along the periphery of panel region; and
    removing the protective film includes removing a region of the protective film which extends throughout the side of the area including the individual panel regions where the liquid crystal injection port is provided and which is near the periphery of the area including the panel regions.

4. A method of man a liquid crystal display according to claim 1, wherein
    each panel region has a substantially rectangular ahs when viewed from above;
    applying the seal material includes applying the seal material along the periphery of each panel region; and
    removing the protective film includes removing a region of the protective film which extends throughout the side of the area including the individual panel regions where the liquid crystal injection port is provided and which is near the periphery of the area including the panel regions, the removed region excluding the region of the protective film which is associated with the liquid crystal injection port formed between the start point and end point of the seal material.

5. A meted of manufacturing a liquid crystal display according to claim 1,
    wherein removing the protective film includes roving the region of the protective film which is associated with the start point and the end point of the seal material and which is near the periphery of the area including the panel regions, the removed region excluding a region of the protective film which is not associated with the start point and end point of the seal material.

6. A method of manufacturing a liquid crystal display according to claim 1, wherein removing the protective film includes removing the region of the protective film which is associated with the liquid crystal injection port between the start point and the end point of the at and which is near the periphery of the area including the panel regions.

7. A method of manufacturing a liquid crystal display according to claim 1, wherein
the protective film includes a first protective film and a second protective film;
forming the protective film includes forming the first protective film and the second protective film on surfaces of the first mother substrate and the second mother substrate, respectively; and
removing the protective film includes removing a region of the first protective film which is associated with at least the start point and the end point of the seal material and which is near the periphery of the area including the panel regions and removing a region of the second protective film which is associated with at least the start point and the end point of the seal material and which is near the periphery of the area including the panel regions.

8. A liquid crystal display comprising:
a first substrate and a second substrate disposed opposite to each other;
a protective film on a surface of at least either of the substrate and the second substrate; and
a seal material having a start point and an end point which define a gap to serve as a liquid crystal injection port and applied on to the protective film along the peripheries of the first substrate and the second substrate, wherein
the protective film is partially removed in a region which is associated with at least the start point and the end point of the seal material and which is opposite to the side of the seal material where the liquid crystal is injected, thereby providing a relief portion into which the seal material can flow, and wherein a liquid crystal layer and a portion of the seal material are disposed on the protective film between the first and the second substrates.

9. A liquid crystal display according to claim 8, wherein the parts of the start point and the end point of the seal material formed in the relief portion of the protective film have a thickness greater than the thickness of the seal material in a region thereof where the relief portion is not provided.

10. An electronic apparatus including a liquid crystal display according to claim 8.

* * * * *